United States Patent [19]

Asano et al.

[11] Patent Number: 4,761,338

[45] Date of Patent: Aug. 2, 1988

[54] MAGNETIC RECORDING MEDIUM

[75] Inventors: Masao Asano; Kazumasa Matsumoto, both of Tokyo; Toshio Tsuji, Hachioji; Yoshitaka Yasufuku, Hino, all of Japan

[73] Assignee: Konishiroku Photo Industry Co., Ltd., Tokyo, Japan

[21] Appl. No.: 96,305

[22] Filed: Sep. 9, 1987

Related U.S. Application Data

[63] Continuation of Ser. No. 815,878, Jan. 3, 1985, abandoned, which is a continuation-in-part of Ser. No. 626,635, Jul. 2, 1984, abandoned.

[30] Foreign Application Priority Data

Jul. 2, 1983 [JP] Japan ................. 58-120698

[51] Int. Cl.$^4$ ............................. G11B 5/702
[52] U.S. Cl. .................. 428/425.9; 252/62.54; 427/128; 428/694; 428/704; 428/900
[58] Field of Search ............ 428/425.9, 694, 695, 428/900, 704; 427/128, 131; 360/134–136; 252/62.54; 528/85

[56] References Cited

U.S. PATENT DOCUMENTS

| | | | |
|---|---|---|---|
| 4,018,968 | 4/1977 | Neumann | 428/900 |
| 4,024,113 | 5/1977 | Ammons | 528/85 |
| 4,105,641 | 8/1978 | Buysch | 528/85 |
| 4,131,731 | 12/1978 | Lai | 528/85 |
| 4,160,853 | 7/1979 | Ammons | 428/412 |
| 4,328,282 | 1/1981 | Lehner | 428/425.9 |
| 4,352,859 | 10/1982 | Yoda | 428/425.9 |
| 4,540,627 | 9/1985 | Ishizawa | 428/694 |
| 4,607,068 | 8/1986 | Ansel | 428/694 |

FOREIGN PATENT DOCUMENTS

| | | | |
|---|---|---|---|
| 141606 | 11/1976 | Japan | 428/694 |
| 107532 | 5/1986 | Japan | |
| 107533 | 5/1986 | Japan | |
| 107534 | 5/1986 | Japan | |
| 006435 | 1/1987 | Japan | |

*Primary Examiner*—Ellis P. Robinson
*Attorney, Agent, or Firm*—Bierman and Muserlian

[57] ABSTRACT

A magnetic recording medium is disclosed which comprises a support and a magnetic recording layer provided on said support, said magnetic recording layer containing a polycarbonate polyurethane obtained by the reaction of a polycarbonatepolyol of the formula

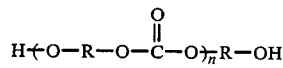

wherein R is selected from the group consisting of aliphatic hydrocarbons having 4 to 12 carbon atoms and aromatic hydrocarbons having 6 to 12 carbon atoms, and n is an integer of not larger than 50 with a polyisocyanate containing a plurality of isocyanate groups and, if necessary, a polyol.

In a preferred form of the invention, the layer also contains, as a dispersant, a compound of the formula

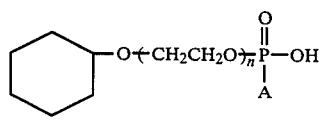

wherein A is hydroxyl, —OM, or

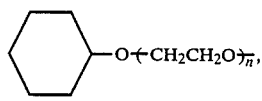

M being an alkali metal and n is an integer from 1 to 30.

13 Claims, 8 Drawing Sheets

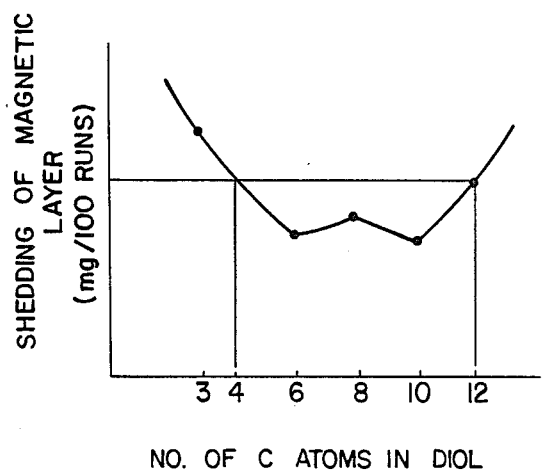
FIG. I
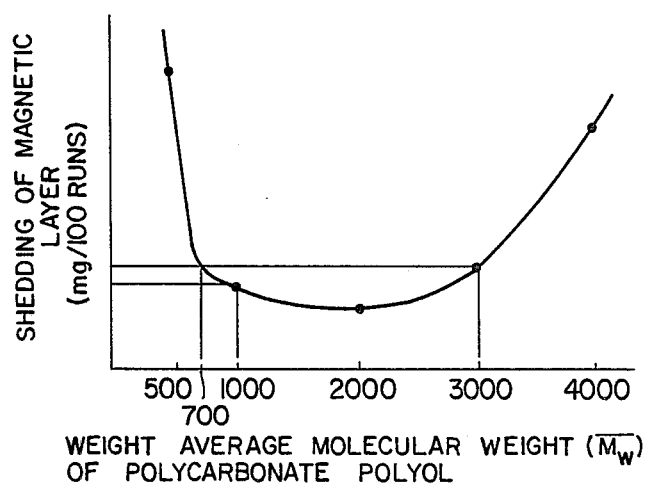
FIG. 2

MAGNETIC RECORDING MEDIUM

This application is a continuation of application Ser. No. 815,878, filed Jan. 3, 1985 now abandoned, which is a continuation-in-part of application Ser. No. 626,635, filed July 2, 1984 now abandoned, which claims the priority of Japanese Application No. 120698/83, filed July 2, 1983.

BACKGROUND OF THE INVENTION

1. Field of the Invention

The present invention relates to a magnetic recording medium such as magnetic tape, magnetic sheet or magnetic disc.

2. Description of the Prior Art

Magnetic recording mediums are manufactured by first preparing magnetic paint containing magnetic particles, a binder and other necessary components, applying the paint onto a support and drying the web.

Magnetic recording materials have recently seen an appreciable technical development, and at the same time, a demand has risen for making magnetic tapes of a higher performance adapted to video, computer and audio applications. All magnetic tapes use a binder that causes magnetic particles to cohere strongly enough to make a rugged magnetic layer, and magnetic video tape having a high relative tape speed especially uses a highly wear-resistant binder. Polyurethane adheres strongly to other materials, has a mechanical strength sufficient to withstand repeated stress or bending, and features good wear-resisting and weathering properties. Therefore, polyurethane may be used as a binder to be incorporated in the magnetic layer. However, the present inventors have found that a magnetic layer using only polyurethane as a binder does not have good running properties since polyurethane has a high frictional coefficient and poor lubricity at the surface. In order to prevent the increase in friction that occurs during tape transport, polyurethane may be blended with other resins or lubricants of low molecular weight. However, polyurethane does not have a high miscibility with other resins. In addition, a blend of polyurethane with low-molecular weight compounds has a high tendency to "bloom" and may foul or clog the magnetic head to provide insufficient electro-to-magnetic conversion characteristics. Furthermore, the insufficiency of film integrity of a magnetic layer using polyurethane as a binder causes increased shedding, which eventually leads to increased dropouts.

A binder for use in a magnetic layer may be made of the carbonate polyester polyurethane shown in Japanese Patent Application (OPI) No. 60430/1983 (the symbol OPI as used herein means an unexamined published Japanese patent application). Because of the carbonate component, this polymer has a high solubility in solvents, and its ester component together with the carbonate component contributes to improved heat resistance (high glass transition temperature, Tg). However, the ester component easily deteriorates (hydrolyzes) under hot and humid conditions and the resulting low moisture resistance interferes with smooth tape running. Japanese Patent Application (OPI) No. 137522/1981 also shows a polyester polyurethane that could be used as a binder. However, this polymer also has an ester component which impairs the moisture resistance of the final tape in spite of its high heat resistance. As a further disadvantage, this polymer has no carbonate component and has a relatively low solubility in solvents. Therefore, the urethane content of this polymer cannot be increased to a sufficiently high level to provide a high film strength. If a lubricant of low molecular weight is used, its content must be increased to ensure high film strength while providing a controlled amount of binder lubricity. However, using an increased amount of lubricant having a low molecular weight will undesirably lead to "blooming".

Therefore, none of the binders proposed so far have a composition that satisfies all the requirements for magnetic tape such as high durability, heat resistance, moisture resistance and great mechanical strength. The magnetic layer used in the current magnetic recording mediums has one or more serious defects such as poor durability, poor running properties and great deterioration upon standing.

SUMMARY OF THE INVENTION

The primary object of the present invention is to provide a film composition satisfying all the requirements of a magnetic layer.

BRIEF DESCRIPTION OF THE DRAWINGS

FIG. 1 is a graph showing the influence of the number of carbon atoms in diol on the amount of shedding of magnetic coating;

FIG. 2 is a graph showing the influence of the weight average molecular weight of polycarbonate polyol on the amount of shedding of magnetic coating;

DETAILED DESCRIPTION OF THE INVENTION

Figure 3:
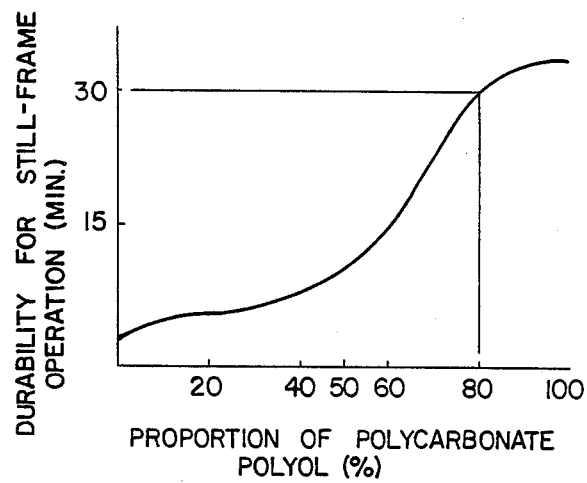
FIG. 3 is a graph showing the influence of the proportion of polycarbonate polyol on the tape durability for still-frame operation.

The present invention therefore relates to a magnetic recording medium having a magnetic layer formed on a support, said magnetic layer at least containing as a binder a polycarbonate polyurethane having no ester bond.

The term "ester bond" as used herein means a bond that is formed by the reaction between an ordinary carboxylic acid and an alcohol, and which consists of the carbon atom of a carbonyl bond (usually) having an adjacent carbon atom directly bonded thereto. It is to be understood that the ester bond as used in this specification does not include —NHCOO— (urethane bond) or

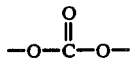

(carbonate bond).

According to the present invention, at least a polycarbonate polyurethane having no ester bond is used as a binder for the magnetic layer. Therefore, in addition to the high wear resistance of the urethane resin, the carbonate component provides an improved heat resistance (Tg) and a higher solubility in solvents. This enables the incorporation of a greater amount of urethane which contributes to the production of a stronger film. Furthermore, unlike the conventional binder, the polycarbonate polyurethane used in the present invention does not contain an ester bond in the molecule, and therefore, the resulting magnetic medium ensures smooth running over an extended period under hot and humid conditions without causing a scratched or cracked film. This advantage results from the high moisture resistance and low tackiness of the polycarbonate polyurethane as defined above.

The polycarbonate polyurethane according to the present invention also has a good miscibility with other polymers (e.g. vinyl chloride-vinyl acetate copolymer and nitrocellulose) that are used to provide a higher film strength and a better dispersibility of magnetic particles. Therefore, the film properties are less likely to change during use and a magnetic medium having improved running properties can be obtained. By means of control over the addition of an isocyanate (to be described later in this specification) as well as by the addition of a polycarbonate polyol (also to be described later in this specification), a curl-free medium can be produced, and this is instrumental not only in the prevention of a skew from occurring in the reproduced video image but also in the betterment of still mode characteristics.

The polycarbonate polyurethane used as a binder for the magnetic layer of the present invention may be synthesized by the urethanation reaction between a polycarbonate polyol

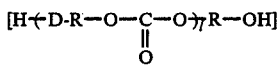

with a polyvalent isocyanate (OCN—R'—NCO) according to the following reaction scheme:

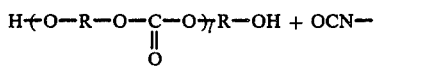

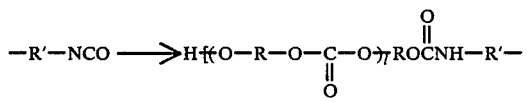

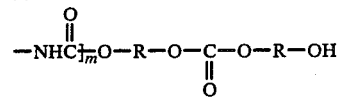

(wherein R and R' are each an aliphatic or aromatic hydrocarbon group; l is preferably not greater than 50 for the purposes of decreasing Tg and preventing film tackiness, and more preferably l is in the range of 1 to 30; m is preferably from 5 to 500 for the purposes of maintaining the good film-forming property and improving the solubility in solvents, and more preferably m is in the range of 10 to 300; and the sum of l and m is preferably so selected that the weight average molecular weight of the polycarbonate polyol polyurethane is in the range of $5 \times 10^4$ to $20 \times 10^4$).

A polycarbonate polyol that can be used in the synthesis of the polycarbonate polyurethane is one which has polyols linked by a carbonate bond. Such a polycarbonate polyol may be produced by condensing known polyols with phosgene, chloroformate ester, dialkyl carbonate or diallyl carbonate. Illustrative polyols include diols having 1 to 10 carbon atoms, for example, 1,10-decanediol, 1,6-hexanediol, 1,4-butanediol, 1,3-butanediol, neopentyl glycol and 1,5-pentanediol. The number of carbon atoms in the polyol, for example, diol, is important and is preferably in the range of 4 to 12. The criticality of this range is apparent from FIG. 1 which shows that increased shedding of magnetic powder occurs (after 100 runs) if the number of carbon atoms is $<4$ and $>12$. According to the results shown in FIG. 2 (shedding after 100 runs of a tape that was left to stand for one week at 60° C.), the polycarbonate polyol prepared by condensing the above polyols is preferably designed to have a molecular weight of ca 500 to 3,000, and more preferably ca 700 to 3,500.

It is important that the polycarbonate polyol to be subjected to the urethanation reaction with the polyisocyanate have active hydrogen (due to —OH) in the polycarbonate. The polyols shown above provide this active hydrogen. Other compounds capable of providing the active hydrogen include ethylene glycol, diethylene glycol, propylene glycol, 1,4-butylene glycol, bisphenol A, glycerin, 1,3,6-hexanetriol, trimethylolpropane, pentaerythritol, sorbitol, sucrose, dipropylene glycol, methyl diethanolamine, ethyl diisopropanolamine, triethanolamine, ethylenediamine, hexamethylenediamine, bis(p-aminocyclohexane), tolyenediamine, diphenylmethanediamine and methylene bis(2-chloroaniline). These compounds may be converted into polyether polyols by addition of one or more "alkylene oxides" selected from among ethylene oxide, propylene oxide, butylene oxide, tetrahydrofuran and styrene oxide.

The active hydrogen containing polycarbonates such as the polycarbonate polyols shown above may be used independently in their reaction with the polyisocyanate. If desired, they may be used in combination with other polyols having 1 to 10 carbonate atoms or other known chain extenders. For example, low-molecular weight polyalcohols such as hexanediol and butanediol may be used for the purpose of making use of their ability to react with excess polyisocyanate to promote gelation. As shown in FIG. 3, for the purpose of providing a sufficient wear resistance, the proportion of the polycarbonate polyol is preferably not less than 80%.

The polyisocyanate to be reacted with the polycarbonate polyol is either aromatic or aliphatic, and aromatic polyisocyanates are preferred. Illustrative aromatic polyisocyanates include tolylene diisocyanate (TDI), (2,4-TDI, 2,6-TDI), dimers of 2,4-tolyene diisocyanate, 4,4'-diphenylmethane diisocyanate (MDI), xylylene diisocyanate (XDI), metaxylylene diisocyanate (MXDI), naphthylene-1,5-diisocyanate (NDI), o-tolylene diisocyanate (TODI), as well as adducts of these isocyanates with active hydrogen containing compounds. These aromatic diisocyanates preferably have average molecular weights in the range of 100 to 3,000. Commercially available aromatic diisocyanates include Sumidyl T 80, 44 S, PF and L, as well as Desmodur T 65, 15, R, RF, IL and SL (products of Sumitomo Bayer Urethane K.K.); Takenate 300 S and 500 (products of Takeda Chemical Industries, Ltd.); "NDI" and "TODI" (products of Mitsui Nisso Urethane Co., Ltd.); Desmodur T 100, Millionate MR and MT, and Collonate L (products of Nippon Polyurethane Industry Co., Ltd.); PAPI-135, TD 165, 80, 100, and Isonate 125M and 143 L (products of Kasei-Upjohn K.K.).

Illustrative aliphatic isocyanates include hexamethylene diisocyanate (HMDI), lysine isocyanate, trimethyl hexamethylene diisocyanate (THDI), and adducts of these isocyanates with active hydrogen containing compounds. Preferred aliphatic isocynates and their adducts with active hydrogen containing compounds are those which have molecular weights in the range of 100 to 3,000. Particularly preferred aliphatic isocyanates are non-alicyclic isocyanates and their adducts with active hydrogen containing compounds.

Commercially available aliphatic isocyanates are Sumidyl N and Desmodur Z 4273 (products of Sumitomo-Bayer Urethane K.K.); Duranate 50M, 24 A-100, and 24 A-90 CX (products of Asahi Chemical Industry Co., Ltd.); Collonate HL (product of Nippon Polyurethane Industry Co., Ltd.); and TMD 1 products by Hüls Corporation. Illustrative non-alicyclic isocyanates are methyl cyclohexane 2,4-diisocyanate, 4,4'-methylene bis(cyclohexylisocyanate), isophorone diisocyanate and their adducts with active hydrogen containing compounds. Commercially available nonalicyclic isocyanates as "IPDI", "IPDI-T1890", "IPDI-H 2921" and "IPDI-B 1065" (products of Hüls). Other usable polyisocyanates are adducts of diisocyanates and triols, pentamers of diisocyanates and decarbonized products obtained by reacting 3 mols of diisocyanate with water. Illustrative examples include an adduct of 3 mols of tolylene diisocyanate and 1 mol of trimethylolpropane, an adduct of 3 mols of metaxylylene diisocyanate and 1 mol of trimethylolpropane, and pentamers of 2 mols of tolylene diisocyanate. All of these polyisocyanates are easily available in the industry.

Figure 4:
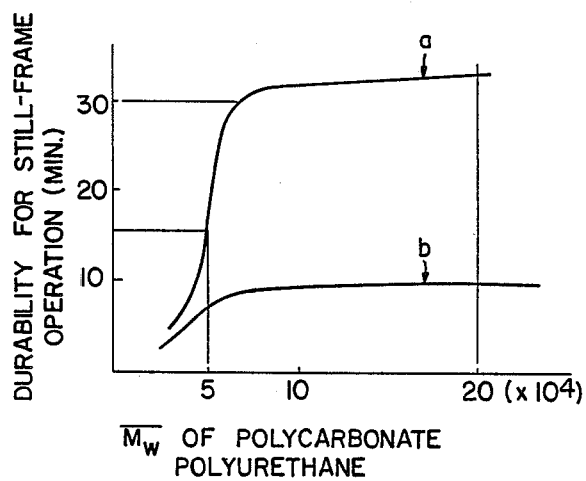
FIG. 4 is a graph showing the influence of the weight average molecular weight of polycarbonate polyol polyurethane on the tape durability for still-frame operation.

Of the two types of polyisocyanates, the aromatic ones are preferred since they act as hard segments and provide a polycarbonate(polyol)polyurethane with maximum rigidity. FIG. 4 shows the weight average molecular weight of the polycarbonate(polyol)polyurethane vs. the tape tackiness, and as one can see from this Figure, the tape tackiness can be held to a minimum by limiting the weight average molecular weight of the polyurethane within the range of $5 \times 10^4$ to $20 \times 10^4$. It is also seen from FIG. 4 that a sufficiently high durability for still-mode operation can be ensured by using an aromatic isocyanate segment (curve a) whereas only a low level of durability results when an aliphatic isocyanate component is used (curve b). Among the aromatic isocyanates listed above, naphthylene-1,5-diisocyanate and diphenylmethane diisocyanate are particularly preferred.

The isocyanates shown above are generally used in such an amount that the NCO group (isocyanate group) in the polyisocyanate is in the range of 0.8 to 1.2, preferably 0.85 to 1.11, per equivalent of the total amount of the active hydrogen present in the active hydrogen containing compound (polycarbonate polyol).

If desired, the manufacture of the polyurethane according to the present invention may involve the use of solvents such as amides (e.g. dimethylformamide and dimethylacetamide), sulfoxides (e.g. dimethylsulfoxide), cyclic ethers (e.g. dioxane and tetrahydrofuran), cyclic ketone (e.g. cyclohexanone), acyclic ketones (e.g. acetone, methyl ethyl ketone and methyl isobutyl ketone), glycol ethers generally known as "cellosolve", "butyl cellosolve", "carbitol" and "butyl carbitol", acetic acid glycol ethers generally known as "cellosolve acetate", "butyl cellosolve acetate", "carbitol acetate" and "butylcarbitol acetate", and dibasic acid esters generally known as "diglyme". These solvents may be used either alone or in combination. They may also be mixed with other solvents such as esters (e.g. ethyl acetate and butyl acetate), aromatic hydrocarbons (e.g. benzene, toluene and xylene), chlorine compounds (e.g. methylene chloride, trichloroethylene, trichloroethane and perchloroethylene), and alcohols (e.g. methanol, ethanol, isopropanol and butanol). Another usable solvent is 2,2,4-trimethyl-1,3-bentanediol monoisobutyrate which is available under the trade name "Kyowanol M" from Kyowa Hakko Kogyo Co., Ltd.

The manufacture of the polyurethane according to the present invention consists of preparing a prepolymer of, for example, a high-molecular weight polyol and an organic isocyanate by reaction at 60°–100° C. for several hours in a nitrogen atmosphere preferably in the presence of a catalyst and/or a solvent, and then heating the so prepared prepolymer at the same temperature for a few more hours until the desired polyurethane resin is obtained. If desired, a reaction terminator may be added during each stage of the reaction under elevated temperatures. A suitable amount of a solvent may also be added to each stage of the reaction for the purpose of reducing the viscosity of the reaction mixture. The resulting solution of the polyurethane resin hs a solids content of 15 to 60% and a viscosity of 200 to 70,000 cPs/25° C.

Figure 5:
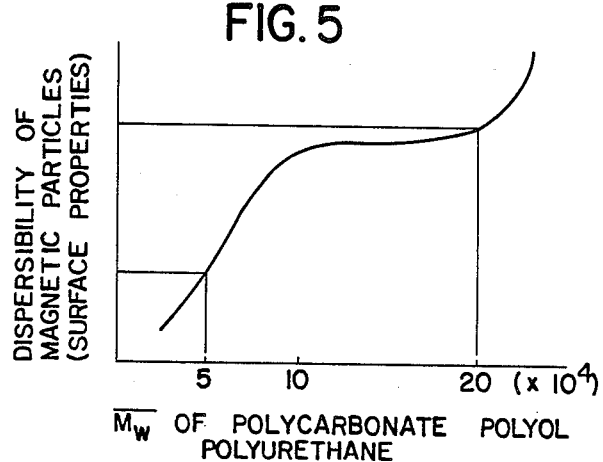
FIG. 5 is a graph showing the influence of the weight average molecular weight of polycarbonate polyol polyurethane on the dispersibility of magnetic particles.

As already stated by reference to FIG. 4, the so prepared polycarbonate(polyol)polyurethane preferably has an average molecular weight in the range of $5 \times 10^4$ to $20 \times 10^4$. As shown in FIG. 5, the polycarbonate polyurethane having a molecular weight in the stated range has been found to provide an improved dispersion of magnetic particles (and hence, a magnetic layer having improved surface properties).

Figure 6:
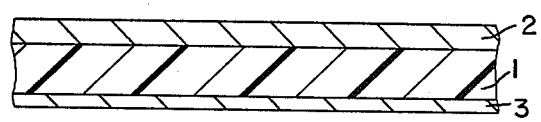
FIGS. 6, 10 and 11 are partial cross sections of magnetic tapes according to three embodiments of the present invention.

The polycarbonate(polyol)polyurethane described above may be incorporated as a binder in a magnetic layer 2 on a support 1 as shown in FIG. 6. In order to permit the tape to be wound in a compact and neat pack and to ensure its stable running, the back side of the support may be provided with a back coat (BC) 3.

The preferred form of the present invention provides a magnetic recording medium having incorporated in a magnetic layer the polycarbonate based polyurethane described above and a compound having the formula

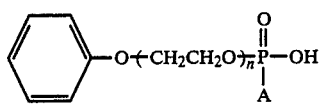

where A is hydroxyl, —OM (where M is an alkali metal), or

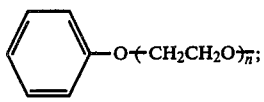

and n is a real number of 1 to 30.

In the course of developing the present invention, the inventors obtained the following new observation. For the sole purpose of increasing the dispersibility of magnetic particles, the conventional aromatic phosphate esters used as dispersants, particularly those of formula (I) shown above have the intramolecular phenyl group substituted by an alkyl group to form an alkylphenyl group. It has therefore been firmly established that these compounds do not provide a good dispersion of magnetic particles unless the intramolecular phenyl group has a substituent such as an alkyl group. The present inventors made a close review of this established idea and found that the dispersibility of magnetic particles was determined merely by the physical properties of the phosphate esters without considering their compatibility with other components of the magnetic layer or the behavior of the molecules of phosphate esters within a magnetic paint. In fact, the conventional phosphate esters have poor compatibility with other components in the magnetic layer and deteriorate its performance, particularly with respect to durability, probably because the alkyl substituent in the intramolecular alkylphenyl group will either cause steric hindrance or experience a certain movement.

The compound having formula (I) shown above has no substituent introduced into the intramolecular phenyl group and is free from any of the phenomena described above. Instead, the compound, while exhibiting its ability to form a good dispersion of magnetic particles, will help produce a magnetic layer having improved durability (particularly in still mode) and heat resistance, whereby high output and high S/N ratio can be attained. The intramolecular phenyl group is oleophilic and rigid so as to exhibit hydrophobicity, while the intramolecular ethylene glycol residue {—(CH$_2$CH$_2$O—)—} exhibits hydrophilicity. Therefore, by mean of adjusting the proportions of the two groups, a proper value of HLB (hydrophilic-lipophilic balance) can be attained.

In formula (I), n should be a real number of 1 to 30 for the purpose of ensuring a good dispersion of magnetic particles in the magnetic layer. Better results are obtained if n=2-20.

If A in formula (I) is

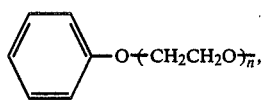

the compound is in a diester form, which may be combined with a monoester form where A is a hydroxyl group for the purpose of providing a recording medium of desired characteristics. Needless to say, the monoester and diester forms may be used independently. Compounds of formula (I) where A is —ONa or —OK may also be used but in this case, magnetic particles are preferably treated with these compounds before they are added to a paint.

The compound (I) is desirably provided with an HLB value of 8-14 by proper selection of n. If the HLB is less than 8, a too lipophilic compound results, and if the HLB is greater than 14, a too hydrophilic compound results. In either case, neither good dispersion nor a dispersion having good time-dependent stability can be obtained.

The compound (I) must be incorporated in a magnetic layer in the proper amount, which preferably ranges from 1 to 10 parts, more preferably from 2 to 7 parts, by weight for 100 parts by weight of the magnetic powder. The compound must be added in an amount of at least 1 part by weight in order to ensure adequate dispersibility of magnetic particles and to provide a magnetic film having satisfactory durability and good surface properties. On the other hand, the compound should not be added in an amount exceeding 10 parts by weight for the purpose of providing an adequately viscous paint that can be easily controlled in forming the proper thickness of the film.

The following are illustrative, but non-limiting, examples of the compound (I) of the present invention.

Compound (i):

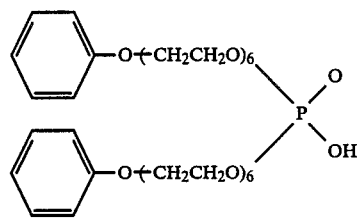

and/or a monophosphate ester thereof;

Compound (ii):

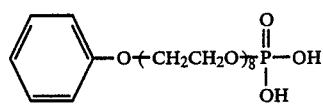

and/or a diphosphate ester thereof;

Compound (iii):

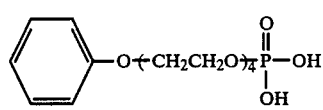

and/or a diphosphate ester thereof:

Compound (iv):

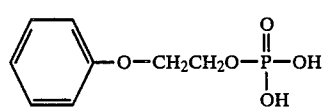

and/or a diphosphate ester thereof;

Compound (v):

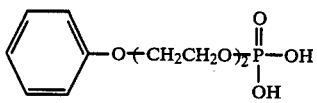

and/or a diphosphate ester thereof;
Compound (vi):

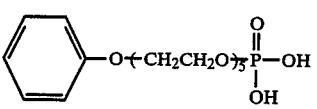

and/or a diphosphate ester thereof;
Compound (vii):

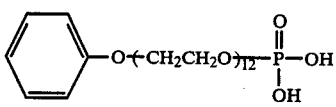

and/or a diphosphate ester thereof; and
Compound (viii):

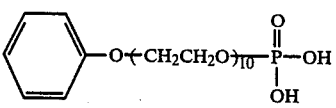

and/or a diphosphate ester thereof.

The magnetic particles are pre-treated with the copolymer that serves as a dispersant, so while they are subjected to a surface treatment in an aqueous medium (e.g. depositing a Co coating on the surfaces of $\gamma$—Fe$_2$O$_3$ particles by treatment in the presence of Co ions, as in Route (A) shown in FIG. 1), the copolymer will strongly adhere to the hydrophilic surfaces of the magnetic particles. In order to attain this result, the solubility of the copolymer in water is desirably such that at least 10 parts by weight of the copolymer is soluble in water. By ensuring this solubility, the dispersibility of magnetic particles and, hence, their squareness ratio can be significantly improved. If, however, the water solubility of the copolymer is excessively high, more of the copolymer will be present in water than it is adsorbed on the magnetic particles, and an insufficient amount of the copolymer will be adsorbed on the particles. Therefore, the water solubility of the copolymer is preferably such that no more than 100 parts by weight of the copolymer is soluble in 100 parts by weight of water. For the purpose of satisfying both requirements for good dispersion of the magnetic particles and higher deposition of the copolymer on the particles, it is more preferable that 10 to 80 parts by weight of the copolymer is soluble in 100 parts by weight of water. The term "solubility" as used herein means the concentration of the copolymer that can be dissolved in a given weight of water until just before the solution becomes turbid.

The magnetic particles treated by the copolymer described above are believed to have primary particles surrounded by the organic polymer (i.e., the copolymer) in such a manner that hydrophilic groups in the polymer are directed toward the hydrophilic surfaces of the magnetic particles while lipophilic groups in the polymer are directed away from the particles. Because of this orientation of hydrophilic and lipophilic groups in the copolymer, the magnetic particles will be dispersed very easily in a magnetic paint. The copolymer is water-soluble and will not dissolve in solvents used for making a magnetic paint; therefore, the copolymer will adsorb strongly to the magnetic particles so as to provide a stable dispersion thereof, and furthermore, no excess dispersant will mix with the binder (because that portion of the copolymer which has not been adsorbed on the magnetic particles will be washed off together with the mother liquor after treatment in an aqueous medium) and a magnetic layer having good mechanical properties can be formed.

Figure 12:
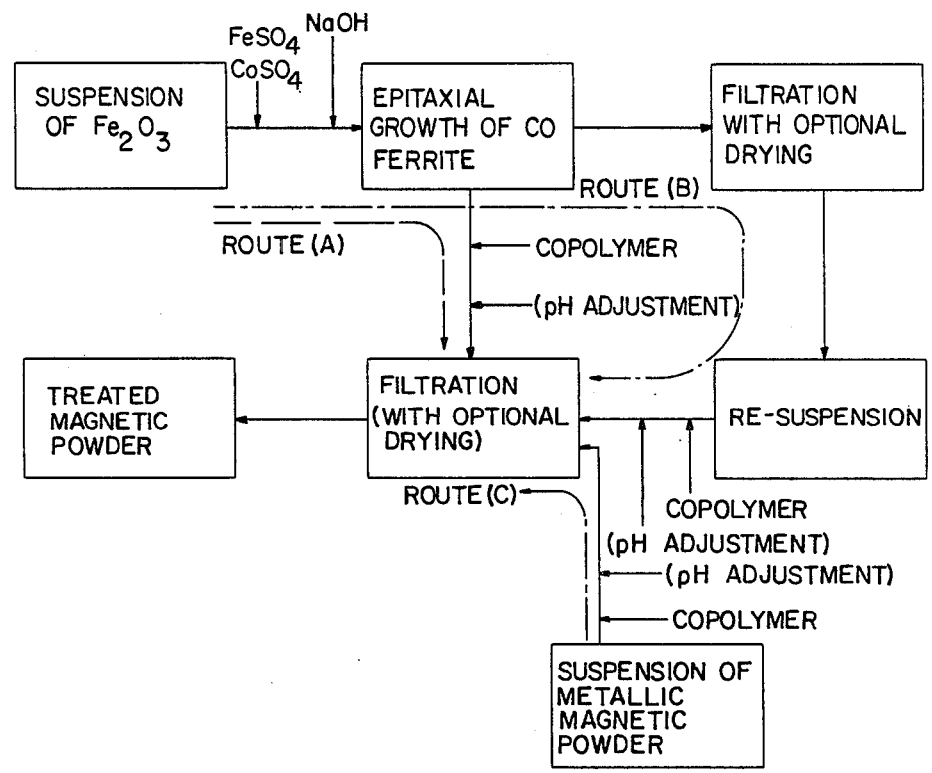
FIG. 12 is a flowsheet for the process of production of a magnetic recording medium in accordance with the present invention.
Figure 13:
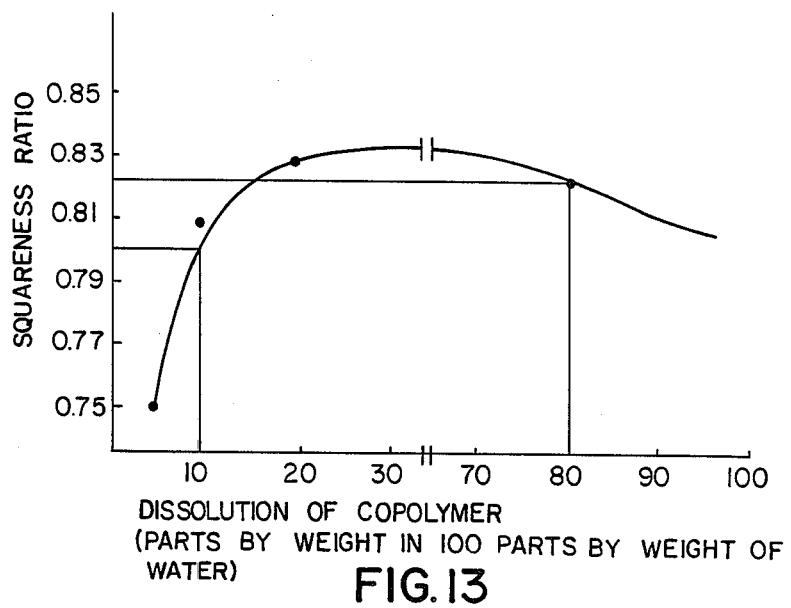
FIG. 13 is a graph of the squareness ratio against dissolution of the copolymer.

The magnetic powder described above of the present invention may be prepared by one of the following methods: the copolymer is adsorbed on the surfaces of magnetic particles in Route (A) shown in FIG. 1; or alternatively, Co-coated particles are subjected to filtration, optionally washed, and immediately thereafter, are suspended in an aqueous medium (e.g. aqueous solution) containing the water-soluble copolymer of the present invention for the purpose of adsorbing the copolymer on the surfaces of the magnetic particles (Route (B) in FIG. 12.

Either of these methods can be implemented with an existing apparatus for producing magnetic particles and the desired particles can be obtained at low cost without employing any special equipment.

The aqueous medium used in the present invention is basically water if the starting magnetic particles are made of $\gamma$-iron oxide and Co-containing oxides, and if desired, water may be combined with small amounts of other water-soluble solvents (e.g. alcohols, ketones, water-soluble cyclic ethers and amines). If metallic magnetic particles are used as the starting material, methanol and other water-soluble solvents may be used.

Figure 15:
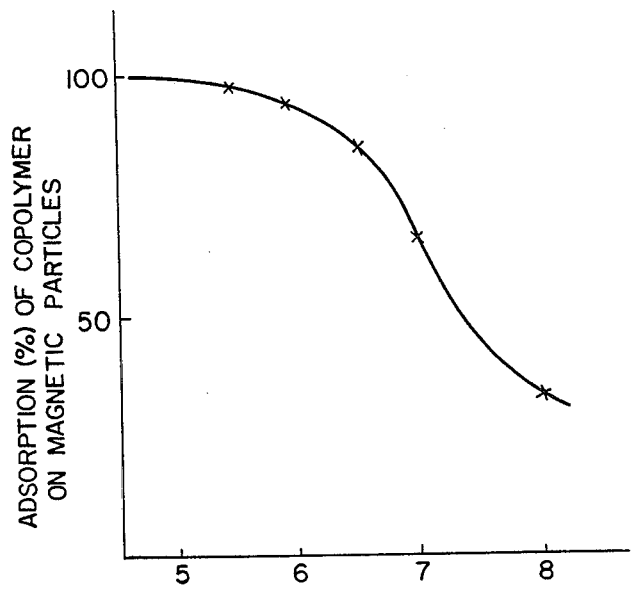
FIG. 15 is a graph of the adsorption of the water-soluble polymer against the pH of the mother liquor

The adsorption of the water-soluble polymer (i.e., the copolymer described above) depends largely upon the pH of the mother liquor. As will be apparent from FIG. 15 better results are obtained if the pH of the mother liquor is no more than 7, preferably no more than 6. The adsorption of the polymer is considerably reduced under alkaline conditions. The water-soluble polymer is adsorbed on the magnetic particles in an amount of 1–10 g, preferably 1–5 g, per 100 g of the magnetic particles. The mother liquor used in the deposition of a Co coating generally exhibits high pH values, so the water-soluble polymer is preferably adsorbed on the magnetic particles after an inorganic acid is added to reduce the pH of the mother liquor to 7 or below. It is particularly preferred that the treatment in accordance with the present invention is performed after the magnetic particles provided with a Co coating are subjected to filtration and washing to remove any of the by-products that have been formed.

As already described, the magnetic particles treated by the present invention exhibit a very good dispersibility, but if an even higher dispersing rate and dispersion stability are needed, a small amount of a dispersant such as lecithin (preferably in the power form), oleic acid or a phosphate ester may be added.

The magnetic particles may be surface-treated by the copolymer within a hydrophilic solvent (e.g. an aqueous methanol solution) in the last step of the process for producing a metallic magnetic powder from $\gamma$—Fe$_2$O$_3$ by the routine method.

The copolymer briefly explained above that is used to perform preliminary treatment of the surface of magnetic particles is hereunder described in greater detail. This copolymer has as one of its building blocks a monomer containing a negative organic group (this monomer is hereunder referred to as monomer unit A). Illustrative negative organic groups are a carboxyl group, a phosphate residue and a sulfonate residue, with the carboxyl group and phosphate residue being preferred. These groups are in salt forms such as an ammonium salt and alkali metal salt, with the ammonium salt being preferred. Illustrative examples of the monomer unit A include acrylic acid, methacrylic acid, maleic anhydride, and 2-hydroxyethylacryloyl phosphate, with the acrylic acid and maleic anhydride being preferred.

Acrylic acid and maleic anhydride are preferred for use as the monomer unit A since they are particularly superior in terms of keeping quality and dispersibility. Additives are known that are customarily used for the purpose of preventing undesired phenomena such as blooming. By using such additives, blooming can be prevented to some extent, but on the other hand, the additives have relatively poor keeping quality and will easily become highly sticky. Furthermore, the magnetic particles treated by these additives have a great chance of agglomerating together when they are dispersed in a solvent for magnetic paint. These problems are entirely absent from the copolymer used in the present invention.

The effects of salts of the negative organic groups present in the copolymer are hereunder described. It should, first of all, be mentioned that a certain negative organic group (e.g. free —COOH) and salts thereof (e.g. ammonium and sodium salts) have different dissociation constants as follows:
(dissociation constant, K)

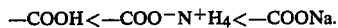
$-COOH < -COO^- N^+H_4 < -COONa$.

The present inventors prepared copolymers having these groups in monomer unit A and treated the surfaces of magnetic particles with these copolymers. Using the so treated magnetic powders, magnetic layers were prepared by the method which will be described in detail later in this specification. Magnetic recording mediums employing these magnetic layers had the squareness ratios (Bm/Br) shown in FIG. 14, from which one can see that the samples employing copolymers having —COOH salts in monomer unit A had higher squareness ratios than the sample employing a copolymer having the simple —COOH group in monomer unit A. This would be explained as follows: a copolymer having a —COOH salt in monomer unit A will not easily desorb from the magnetic particles when they are dispersed in a solvent and binder, and the copolymer becomes more hydrophilic to strongly adhere to the magnetic particles; on the other hand, the simple —COOH group, which inheretly is easy to adhere or bond to the surfaces of magnetic particles, is more liophilic than its salt forms and will easily desorb from the magnetic particles to dissolve into the solvent; at the same time, the desorbed copolymer will bloom to the surface of magnetic tape, leaving those magnetic particles behind which carry no copolymer that has been adhered or bonded to their surfaces.

Figure 14:
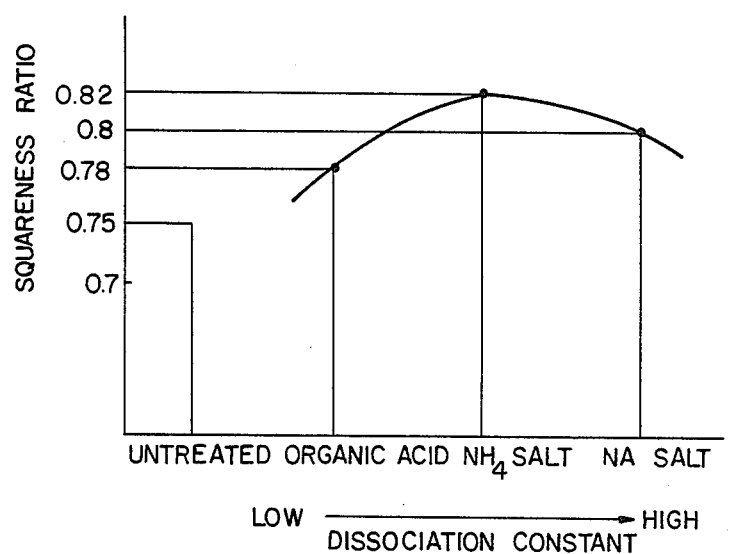
FIG. 14 is a graph of the squareness ratio against the dissociation constant.

FIG. 14 also shows that the ammonium salt provided better magnetic properties than the alkali metal salt and that the squareness ratio which assumed a maximum value when the ammonium salt was used decreased when the dissociation constant was higher or lower than that of the ammonium salt. This could be explained as follows: the alkali metal salt, having a greater degree of hydrophilicity (probably due to its fairly high dissociation constant), is easily bonded to the surfaces of magnetic particles during treatment in an aqueous system but, at at the same time, this salt is easy to desorb from the magnetic particles; on the other hand, the ammonium salt will not adsorb on magnetic particles as strongly as the free acid but once it adsorbs, it will desorb in a smaller amount from the magnetic particles which, hence, will form the most stable dispersion; in other words, the ammonium salt having the proper dissociation constant will render the copolymer to be more adsorptive on the magnetic particles rather than desorptive therefrom.

The ammonium salts that can be used in the present invention include the aforementioned $-COO^-N^+H_4$ and are represented by the following general formula:

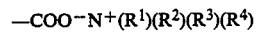
$-COO^-N^+(R^1)(R^2)(R^3)(R^4)$ where $R^1$ to $R^4$ which may be the same or different are each a hydrogen atom or a lower alkyl group. If $R^1$ to $R^4$ are lower alkyl groups, the total number of carbon atoms in $R^1$ to $R^4$ is desirably no more than 6 for the purpose of avoiding steric hindrance which may impair the basicity of the ammonium salt.

The copolymer used in the present invention may be expressed by $\{A\}_m[B]_n$ where $\{A\}_m$ is the monomer unit A (m=a positive real number) and $\{B\}_n$ is a monomer unit B (n=a positive real number). The average of (m+n) is no more than 100, preferably no more than 50. If the average of (m+n) exceeds 100, the magnetic particles will not be uniformly dispersed in the magnetic layer, and the resulting magnetic recording medium is prone to be non-uniform in its performance such as, for example, output. It is particularly preferable that (m+n) is no more than 30 and if this requirement is satisfied, magnetic particles will be dispersed most uniformly) to provide a superior magnetic recording medium. With a view to preventing the occurrence of blooming, the average value of (m+n) is preferably at least 4.

By properly selecting the values of m and n, and the type of the salt of the organic group present in unit A, the copolymer can be provided with a suitable combination of its hydrophilic and hydrophobic properties, or a suitable HLB (hydrophilic-lipophilic balance) value.

Examples of the monomer unit B include styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, 3,4-dichlorostyrene and other styrene derivatives. Other vinyl monomers may also be used and they include ethylenically unsaturated monolefins such as ethylene, propylene, butylene, isobutylene, diiso-butylene, isononene and isododecene; vinyl halides such as vinyl chloride, vinylidene chloride, vinyl bromide and vinyl fluoride; vinyl esters such as vinyl acetate, vinyl propionate, vinyl benzoate and vinyl butyrate, esters of α-methylene aliphatic monocarboxylic acids such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2- chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, steary methacrylate, phenyl methacrylate, dimethylaminoethyl methacrylate, and diethylaminoethyl methacrylate; acrylic acid and methacrylic acid derivatives such as acrylonitrile, methacrylonitrile and acrylamide; vinyl ethers such as vinyl methyl ether, vinyl ethyl ether and vinyl isobutyl ether; vinyl ketones such as vinyl methyl ketone, vinyl hexyl ketone and methyl isopropenyl ketone; N-vinyl compounds such as N-vinylpyrrole, N-vinylcarbazole, N-vinylindole and N-vinylpyrrolidone; and vinyl naphthalenes.

Preferred copolymers (water-soluble polymers) are those which contain at least two carboxyl groups (in any one of the salt forms described above) in the monomer unit A when the copolymers are in the form of salts.

The following are examples of the monomer unit A satisfying this requirement:

(1)

(This unit may be prepared from maleic anhydride under the action of ammonia; n in the formula represents a recurring unit as in the formulas shown below);

(2)

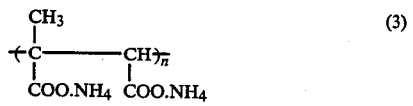
(3)

Preferred examples of the monomer unit B include alkylene, arylalkylene and derivatives thereof, with the alkylene being particularly preferred. These monomer units derive from alkenes or arylalkenes. Branched-chain alkylenes are especially desirable in that they have good solubility in organic solvents and permit thorough mixing with the binder. Preferred examples of the starting material from which the monomer unit B is prepared are listed below:
(1) isobutylene;
(2) 2,3-dimethyl-1-butene;
(3) 2,3-dimethyl-1-pentene;
(4) isooctene (diisobutylene);
(5) idododecene; and
(6) isononene.

The copolymers used in the present invention may be produced by copolymerizing two or more of the starting materials listed above. The resulting products could be identified as the desired copolymers by GC/Mass analyses wherein the portion corresponding to the alkene was divided into two signals, one for the isooctene and the other for isobutylene, while the portion corresponding to the acid (e.g. maleic anhydride) was divided into signals for toluene, diethylbenzene, styrene, etc.

Any of the copolymers described above that are used in the present invention alternately exhibit hydrophilicity resulting from the monomer unit A and lipophilicity due to the monomer unit B, and once the monomer unit A is attached to the surface of a magnetic particle, the monomer unit B will work effectively in the aqueous medium to eliminate the chance of the copolymer of detaching from the particle. The other function of the monomer unit B is to ensure uniform dispersion of the magnetic particles while they are mixed with a binder containing the polycarbonate based urethane resin. The copolymers are advantageously present in amounts of 1-20 parts by weight per 100 parts by weight of the magnetic particles. If the amount of the copolymer is less than 1 part by weight for 100 parts by weight of the magnetic powder, a uniform dispersion of the magnetic particles will not be obtained, and using more than 20 parts by weight of the copolymer is not desirable from the viewpoints of the strength of the magnetic layer and the recording performance of the magnetic medium.

The surfaces of magnetic particles may be treated with the copolymer of the present invention by one of the following procedures: the magnetic particles (e.g. γ—$Fe_2O_3$) are immersed in an aqueous solution of a Co compound (e.g. $CoSO_4$) in the presence of an alkali such as NaOH, whereby a Co coating is formed on the surfaces of individual magnetic particles, and thereafter, the pH of the mother liquor is reduced by addition of an inorganic acid (e.g. $H_2SO_4$ and, at a reduced pH, the magnetic particles are treated with the copolymer; alternatively, the magnetic particles provided with a Co coating are subjected to filtration and optionally washed with water to remove any by-products before the particles are treated with the copolymer. Illustrative solvents that may be used for the surface treatment with the copolymer include water and aqueous solutions of methanol, ethanol, propanol, acetone, methyl isobutyl ketone, tetrahydrofuran, dioxane, pyridine and hydroxyquinoline. The so treated magnetic particles are then mixed with the binder and other various additives by routine methods, whereby a magnetic paint is prepared. The paint is applied to a base (or support) and dried to form a magnetic layer. The web then is calendered and slit to given lengths to make a magnetic recording medium such as, for example, magnetic tape. Magnetic disks may be obtained by subsequent burnishing treatment.

The route (B) shown in the process flowsheet of FIG. 12 includes a step of filtering a dispersion of magnetic particles that have been provided with high coercive forces by the growth of Co-ferrite (Co-coated particles), and this step is beneficial to the purpose of providing a magnetic powder with good characteristics by removing any unwanted materials and free Co ions. In this route (B), a variety of solvents may be used for re-suspending the magnetic particles, and in this step, additives that are highly compatible with the binder, such as weakly water-soluble dispersants (e.g. lecithin and higher aliphatic acids) may be added for the purpose of controlling the physical properties of the magnetic powder in an even better manner. In route (C), the copolymer may be added to a suspension of metallic magnetic particles prepared by known techniques (e.g. iron powder obtained by reduction of γ—$F_2O_3$ and iron powder obtained by reduction of $Fe_3O_4$ resulting from α—$Fe_2O_3$ that is formed by dehydration of α—FeOOH).

The present invention is hereunder described in greater detail with reference to specific working examples, wherein all "parts" are by weight. The components, their proportions and the order of the steps used in these examples may be modified in various manners without departing from the spirit and scope of the present invention.

According to the present invention, a cellulosic resin and a vinyl chloride copolymer may also be incorporated in the magnetic layer as binders in addition to the polycarbonate polyurethane. These additional binders are effective in improving the dispersibility of the magnetic particles and hence increasing the mechanical strength of the magnetic layer. A magnetic layer using only the cellulosic resin or the vinyl chloride copolymer as a binder is too hard to be used for practical purposes, and this problem can be solved by incorporating the polyurethane described above.

Suitable cellulosic resins include cellulose esters, inorganic acid esters of cellulose, and organic esters of cellulose. Illustrative cellulose esters are methyl cellulose, ethyl cellulose, propyl cellulose, isopropyl cellulose, butyl cellulose, methyl ethyl cellulose, methyl hydroxyethyl cellulose, ethyl hydroxyethyl cellulose, carboxymethyl cellulose, sodium salt of carboxymethyl cellulose, hydroxyethyl cellulose, benzyl cellulose, cyanoethyl cellulose, vinyl cellulose, nitrocarboxymethyl cellulose, diethylaminoethyl cellulose, and aminoethyl cellulose. Illustrative inorganic acid esters of cellulose are nitrocellulose, cellulose sulfate and cellulose phosphate. Illustrative organic acid esters of cellulose are acetyl cellulose, propionyl cellulose, butyryl cellulose, methacryloyl cellulose, chloroacetyl cellulose, β-oxypropionyl cellulose, benzoyl cellulose, cellulose p-toluenesulfonate, acetylpropionyl cellulose and acetylbutyryl cellulose. Among these cellulosic resins, nitrocellulose is particularly preferred. Commercially available examples of the nitrocellulose are Celnoba BTH ½ and Nitrocellulose SL-1 (products of Asahi Chemical Industry Co., Ltd.) and Nitrocellulose RS ½ (product of Daicel Chemical Industries, Ltd.). Preferably, the nitrocellulose has a viscosity (as defined in JIS K-6703 (1975)) in the range of 2 to 1/64 second, especially from 1 to ¼ second. Viscosities outside the range of 2 to 1/64 second will produce a magnetic layer which is weak and does not adhere strongly to the support.

Suitable vinyl chloride copolymers that can be used with the polycarbonate polyurethane as binders may be represented by the following formula:

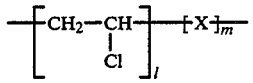

wherein the molar ratios as calculated from l and m are 95–50 mol% for the unit

Figure 7:
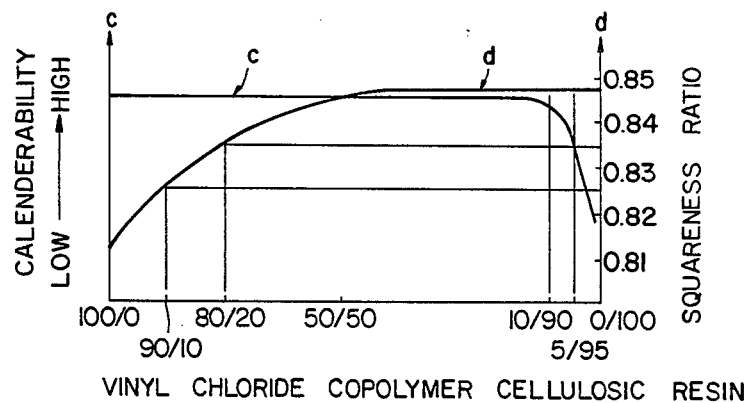
FIG. 7 is a graph showing the tape characteristics vs. the proportions of vinyl chloride copolymer and cellulosic resin used as binders in addition to polycarbonate polyol polyurethane.

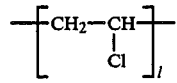

and 5–50 mol% for the unit $-X]_m$; X is at least one monomeric residue that is copolymerizable with vinyl chloride and which is selected from the group consisting of vinyl acetate, vinyl alcohol, maleic anhydride, maleic anhydride ester, maleic acid, maleic acid ester, vinylidene chloride, acrylonitrile, acrylic acid, acrylic acid ester, methacrylic acid, methacrylic acid ester, vinyl propionate, glycidyl methacrylate and glycidyl acrylate. The degree of polymerization as represented by (l+m) is preferably in the range of 100 to 600. If the degree of polymerization is less than 100, a sticky magnetic layer would result, and if the polymerization degree exceeds 600, the dispersibility of magnetic particles is reduced. The vinyl chloride copolymers as defined here may be partially hydrolyzed. Preferred vinyl chloride copolymers are those which contain vinyl chloride-vinyl acetate monomers units (hereunder referred to as "vinyl chloride-vinyl acetate copolymers") Illustrative vinyl chloride-vinyl acetate copolymers include vinyl chloride-vinyl acetate-vinyl alcohol, vinyl chloride-vinyl acetate-maleic anhydride, vinyl chloride-vinyl acetate-vinyl alcohol-maleic anhydride, and vinyl chloride-vinyl acetate-vinyl alcohol-maleic anhydride-maleic acid copolymers. Partially hydrolyzed vinyl chloride-vinyl acetate copolymers are preferred. Commercially available vinyl chloride-vinyl acetate copolymers include "VAGH", "VYHH" and "VMCH" by Union Carbide Corporation, "ES-lec A-5", "ES-lec C" and "ES-lec M" by Sekisui Chemical Co., Ltd., as well as "Denka Vinyl 1000 G" and "Denka Vinyl 1000 W" by Denki Kagaku Kogyo K.K. The vinyl chloride copolymers and cellulosic resins shown above may be blended in any proportions, but as shown in FIG. 7, the weight ratio of the vinyl chloride resin to the cellulosic resin is preferably in the range of 90:10 to 5:95, more preferably from 80:20 to 10:90. If the amount of the cellulosic resin is excessive (i.e., if the weight ratio of the vinyl chloride resin to cellulosic resin is less than 5:95), the resulting film has poor "calenderability" and its surface properties have a tendency to cause increased dropouts. If the amount of the vinyl chloride copolymer is excessive (i.e., if the weight ratio of the vinyl chloride resin to cellulosic resin is greater than 90:10), the magnetic particles will not be sufficiently dispersed and a low squareness ratio may occur. The criticality of the weight ratio of the vinyl chloride copolymer to cellulosic resin is apparent from FIG. 7 which plots the film calenderability on axis c and the squareness ratio on axis d. Moving further upward on axis c, the calenderability increases to provide a better film.

Figure 8:
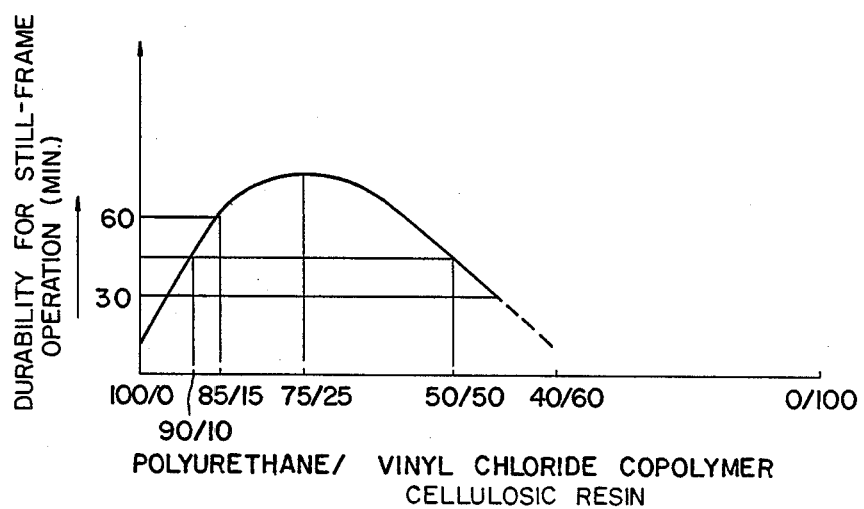
FIG. 8 is a graph showing the tape durability for still-frame operation vs. the ratio of polycarbonate polyol polyurethane to the sum of vinyl chloride copolymer and cellulosic resin.

If the polycarbonate polyurethane according to the present invention is used as a binder in combination with the vinyl chloride copolymer and cellulosic resin, the weight ratio of the polyurethane to the sum of the two other resins is preferably in the range of 90:10 to 50:50, more preferably from 85:15 to 60:40, as shown in FIG. 8. If the amount of the polyurethane is excessive (>90:10), a poor dispersion of the magnetic particles will occur and the film durability for still-frame operation may be reduced. If, on the other hand, the amounts of the vinyl chloride copolymer and cellulosic resin are excessive, the resulting film will have poor surface properties and a reduced still mode durability. In particular, if the total amount of the resins other than the polyurethane exceeds 60 wt% of the whole binder composition, the overall characteristics of the magnetic layer are appreciably deteriorated.

The magnetic layer 2 shown in FIG. 6 has a magnetic material especially a ferromagnetic material, dispersed in the binder described above. Examples of the ferromagnetic material include iron oxides such as γ—Fe$_2$O$_3$, Co-containing γ—Fe$_2$O$_3$, Fe$_3$O$_4$ and Co-containing Fe$_3$O$_4$; and metallic particles mainly composed of metals such as Fe, Ni and Co, or alloys such as Fe—Ni- —Co, Fe—Mn—Zn, Fe—Ni—Zn, Fe—Co—Ni—Cr, Fe—Co—Ni—P, and Co—Ni.

In addition to the polycarbonate polyurethane and the binders described above, the magnetic layer 2 may use as an optional binder a mixture of one of the three binders with a thermoplastic resin, thermoset (or reactive resin, or a resin that cures upon irradiation with electron beams.

Suitable thermoplastic resins have a softening point of less than 150° C., an average molecular weight of about 10,000 to 200,000, and a degree of polymerization of about 200 to 2000. Examples of such polymers are acrylic acid ester/acrylonitrile copolymer, acrylic acid ester/vinylidene chloride copolymer, acrylic acid ester/styrene copolymer, methacrylic acid ester/acrylonitrile copolymer, methacrylic acid ester/vinylidene chloride copolymer, methacrylic acid ester/styrene copolymer, urethane elastomer, poly(vinyl fluoride), vinylidene chloride/acrylonitrile copolymer, butadiene/acrylonitrile copolymer, polyamide resin, polyvinyl butyral, styrene/butadiene copolymer, polyester resin, chlorovinyl ether/acrylic acid ester copolymer, amino resins, various synthetic rubber thermoplastic resins and mixtures thereof.

The thermosetting or reactive resin is such that it has a molecular weight of less than 200,000 when it is in coating solution and that after application and drying of a coating solution, its molecular weight is increased infinitely due to condensation, addition or other reactions. Preferred thermosetting or reactive resins are those which do not soften or melt until they are decomposed with heat. Specific examples are phenolic resins, epoxy resins, urea resin, melamine resin, alkyd resin, silicon resin, acrylic reactive resin, a mixture of high-molecular weight polyester resin and isocyanate prepolymer, a mixture of methacrylic acid salt copolymer and diisocyanate prepolymer, urea-formaldehye resin, polyamine resins and mixtures thereof.

Illustrative resins that cure upon irradiation with electron beams include unsaturated prepolymers such as maleic anhydride type, urethane acrylic type, polyester acrylic type, polyether acrylic type, polyurethane acrylic type and polyamide acrylic type, as well as polyfunctional monomers such as ether acrylic type, urethane acrylic type, phosphate ester type, aryl type and hydrocarbon type.

According to the present invention, the binder is used in an amount of 5 to 400 parts by weight, preferably 10 to 200 parts by weight, per 100 parts by weight of the ferromagnetic material.

If the binder is used in an excessive amount, the resulting magnetic recording medium has a low recording density, and if the binder content if too low, a weak magnetic layer which is less durable and sheds off easily is formed.

In order to produce a highly durable magnetic recording medium, a crosslinking agent may be incorporated in the magnetic layer in addition to the isocyanates shown above. Suitable cross-linking agents are triphenylmethane triisocyanate, tris-(p-isocyanatophenyl)thiophosphite and polymethylenepolyphenyl isocyanate.

Besides the ferromagnetic material, binder and crosslinking agent described above, the magnetic paint for making a magnetic coating may contain other additives such as dispersants, lubricants, abrasives and antistats.

Usable dispersants include lecithin, phosphate esters, amine compounds, alkyl sulfates, aliphatic acid amides, higher alcohols, polyethylene oxide, sulfosuccinic acid, sulfosuccinic acid esters known surfactants and salts thereof. Also usable are polymeric dispersants having an electronegative group (e.g. —COOH or —PO$_3$H). These dispersants may be used either alone or in combination. They are used in an amount of 1 to 20 parts by weight per 100 parts by weight of the binder. If desired, they may be added for the purpose of surface-treating the ferromagnetic material.

Illustrative lubricants include silicone oil, graphite, carbon black graft polymer, molybdenum disulfide, tungsten disulfide, lauric acid, myristic acid, and aliphatic acid esters (commonly referred to as waxes) comprising monobasic aliphatic acids having 12 to 16 carbon atoms and monohydric alcohols having 21 to 23 carbon atoms as combined with the carbon atoms present in said aliphatic acids. These lubricants are used in an amount of 0.2 to 20 parts by weight per 100 parts by weight of the binder.

Common abrasives may be used in the present invention, and they include fused alumina, silicon carbide, chromium oxide ($Cr_2O_3$), corundum, artificial corundum, diamond, artificial diamond, garnet, and emergy (main components: corundum and magnetite). These abrasives have an average particle size of 0.05 to 5$\mu$, and a 0.1 to 2$\mu$ range is particularly preferred. They are used in an amount of 1 to 20 parts by weight per 100 parts by weight of the binder.

Suitable antistats are fine particles of an electrically conductive material such as carbon black, graphite, tin oxide-antimony oxide compound, or titanium oxide-tin oxide-antimony oxide compound; a natural surfactant such as saponin; an alkylene oxide, glycerin or glycidol nonionic surfactant; a cationic surfactant such as higher alkylamines, quaternary ammonium salts, heterocyclic compounds (e.g. pyridine), and phosphonium or sulfoniums; an anionic surfactant containing an acidic group such as carboxylic acid group, sulfonic acid group, phosphoric acid group, sulfate ester group or phosphate ester group; and an amphoteric surfactant such as amino acids, aminosulfonic acids, and sulfate or phosphate esters of aminoalcohol.

The magnetic recording medium according to the present invention preferably contains two types of carbon blacks, one being used for the purpose of imparting electrical conductivity to the magnetic particles (the first type of carbon black is hereunder referred to as $CB_1$) and the other being used to shield the magnetic layer from light (this second type of carbon black is hereunder referred to as $CB_2$).

Static charge buildup on the magnetic recording medium during its use can be a problem. Sudden large electrical discharges in the gap between the medium and the magnetic head can cause a noisy signal; static charges also attract extraneous debris and particles which lead to dropouts. In some applications, especially in video systems, the tape transport speed is controlled by detecting the difference in light transmittance between the tape with a magnetic coating and the leader tape. It is therefore generally required that the magnetic layer have a surface resistivity of not greater than $10^9 \Omega$-cm and the tape with the magnetic layer have a light transmittance of 0.05% or less. In order to meet these requirements, carbon black particles are usually incorporated in the magnetic layer.

If the two types of carbon blacks, $CB_1$ and $CB_2$, are to be used, their preferred surface areas are respectively in the ranges of 200–500 m$^2$/g (more preferably 200–300

Figure 9:
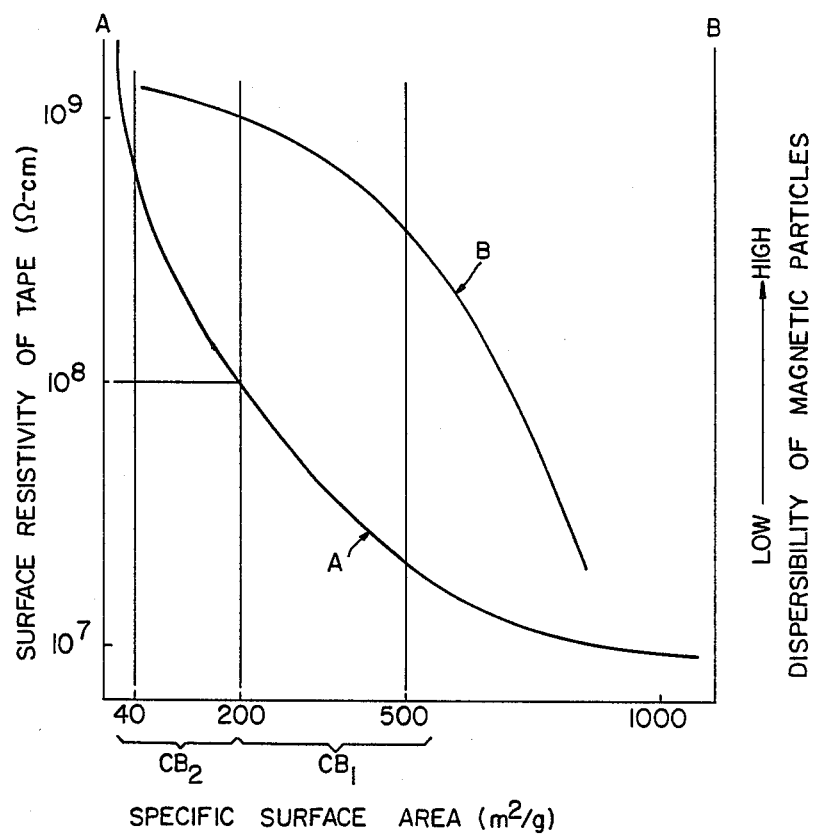
FIG. 9 is a graph showing the tape characteristics vs. the specific surface area of carbon black particles.

$m^2/g$) and 40–200 $m^2/g$. As shown in FIG. 9, if $CB_1$ has a surface area of less than 200 $m^2/g$, its particle size is too great to provide sufficient electrical conductivity, whereas if it has a surface area greater than 500 $m^2/g$, the particle size is so small that the dispersibility of the carbon black particles will be impaired. An advantageous morphology of $CB_1$ is such that individual particles agglomerate to form a "bunch of grapes", and carbon black particles of high "structure level" which are porous and have a great specific surface area are preferred. Examples of the preferred carbon black $CB_1$ are Conductex 975 by Columbian Carbon Company (specific surface area: 270 $m^2/g$, particle size: 46 m$\mu$), Conductex 950 (specific surface area: 245 $m^2/g$, particle size: 46 $\mu$m) and Cabot Vulcan XC-72 (specific surface area: 257 $m^2/g$, particle size: 18 m$\mu$).

As also shown in FIG. 9, if the other type of carbon black, $CB_2$, has a specific surface area of less than 40 $m^2/g$, its particle size is too great to provide a sufficient sheild from light, and it becomes necessary to use an excessive amount of $CB_2$. On the other hand, if $CB_2$ has a specific surface area greater than 200 $m^2/g$, its particle size is so small that the dispersibility of the carbon black particles will be impaired. The light-shielding carbon black $CB_1$ preferably has a small particle size and relatively low values for both structure level and specific surface area; specific examples are Raven 2000 manufactured by Columbian Carbon Company (specific surface area: 180 $m^2/g$, particle size: 19 m$\mu$), and other members of the same family, such as Raven 2100, 1170, 1000, #100, #75, #44, #40, #35 and #30.

The two types of carbon black are preferably mixed in particular proportions; a typical weight ratio of $CB_1$ to $CB_2$ ranges from 90:10 to 50:50, and the range of 80:20 to 60:40 is particularly effective. If the weight ratio of $CB_1$ to $CB_2$ is greater than 90:10, a sufficient shield from light is not obtained, whereas if the $CB_1:CB_2$ weight ratio is smaller than 50:50, the specific surface resistivity of the carbon black powder is increased.

The term "specific surface area" as used above means the surface area of a unit weight of carbon particles and represents a physical quantity which differs entirely from the average particle size. Two samples of particles having the same average size may have different specific surface areas. For the purposes of the present invention, the specific surface area of a carbon black powder is measured as follows: a sample of the powder is degassed by heating at ca. 250° C. for 30–60 minutes until any debris becomes desorbed from the particles; the so treated sample is introduced into the analysis device which uses nitrogen as adsorbate at an initial pressure of 0.5 kg $r/m^2$ at $-195°$ C. (the temperature of liquid nitrogen). This adsorption technique for specific surface area measurements is commonly called the BET method, and its details are found in J. Ame. Chem. Soc., 60, 309 (1938). A device that can be used to measure the specific surface area (BET value) of carbon particles is "Canterthope", the particle analyzer developed jointly by Yuasa Battery Co., Ltd. and Yuasa Ionics Co., Ltd. The general discussion of the specific surface area and the methods for its measurement are also found in "Powder Analysis" by J. M. D. Allavalle and Clyde Orr Jr, translated into Japanese as "Funtai no Sokutei" by Muta et al. and published by Sangyo Tosho, as well as in "Chemical Handbook (kagaku binran)—Applications", pp. 1170–1171, ed. by the Chemical Society of Japan, published by Maruzen, Apr. 30, 1966. The latter publication uses the term "surface area ($m^2/gr$)" to express the idea of "specific surface area" as used in this specification.

Various solvents may be used for preparing a magnetic paint or as an aid to the application of the magnetic paint. Suitable solvents include ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate, and ethylene glycol mono-acetate; ethers such as ethyleneglycol dimethyl ether, diethylene glycol monoethyl ether, dioxane and tetrahydrofuran; aromatic hydrocarbons such as benzene, toluene and xylene; halogenated hydrocatbons such as methylene chloride, ethylene chloride, carbon tetrachloride, chloroform, and dichlorobenzene.

Suitable materials for the base 1 include polyesters such as poly(ethylene terephthalate) and poly(ethylene-2,6-naphthalate); polyolefins such as polypropylene; cellulose derivatives such as cellulose triacetate and diacetate; plastics such as polycarbonate; metals such as aluminum, and zinc; and ceramics such as glass, silicon nitride, silicon carbide, china and japan.

The thickness of the base varies with their physical shape. For films and sheets, the thickness is between about 3 and 100 $\mu$m, preferably from 5 to 50 $\mu$m; for disks and cards, the thickness ranges from about 30 $\mu$m to 10 mm. The bases may be in a cylindrical drum shape whose specific configuration is determined by the type of the recorder with which the magnetic recording medium of the present invention is used.

A magnetic coating is formed from the magnetic paint on the base by air doctor coating, blade coating, air knife coating, squeeze coating, impregnate coating, reverse roll coating, transfer roll coating, gravure coating, kiss coating, cast coating, and spray coating.

The magnetic coating thus formed on the base is dried after the ferromagnetic particles in the coating are optionally oriented in a magnetic field. If necessary, the web with the magnetic coat may be calendered to provide a smooth surface, or may be slit into a shape desired for the final magnetic recording medium.

The magnetic recording medium shown in FIG. 6 may or may not be provided with a subbing layer (not shown) between the magnetic layer 2 and the support 1.

The BC layer 3 shown in FIG. 6 may have incorporated therein nonmagnetic particles made of carbon black, silicon oxide, titanium oxide, aluminum oxide, chromium oxide, silicon carbide, calcium carbide, zinc oxide, $\alpha$—$Fe_2O_3$, talc, kaolin, calcium sulfate, boron nitride, zinc fluoride, molybdenum dioxide or calcium carbonate, and those composed of carbon black or titanium oxide are preferred. These nonmagnetic particles will improve the surface properties of the BC layer by matting it or roughening to a suitable degree. If the nomagnetic particles are made of carbon black, they will provide the BC layer with electrical conductivity to prevent static buildup. Advantageously, carbon black particles may be combined with other nonmagnetic materials not only to improve the surface properties of the BC layer (which leads to stable tape running) but also to provide a better electrical conductivity.

The surface roughness of the BC layer may be characterized by an average roughness or height on the center line of surface asperities (Ra) which is 0.01–0.1 $\mu$m, preferably not more than 0.025 $\mu$m, and a maximum roughness (Rmax) of 0.20–0.80 $\mu$m. For better chroma S/N, Ra$\leqq$0.025 $\mu$m is preferred. If the value of Ra or Rmax is too small, the magnetic recording medium (typically tape) will not run smoothly and cannot be wound into a neat pack. If the value of Ra or Rmax is too great, print-through, or printing of unwanted signals from the BC coating of one layer of tape to the magnetic coating of an adjacent layer, will occur during tape winding, and this is another factor which leads to the surface properties of the tape being impaired.

In order to achieve the surface roughness defined above, the fillers (including nonmagnetic particles) incorporated in the BC layer 3 generally have a particle size of not more than 0.5 μm, preferably not more than 0.2 μm. The BC layer 3 may be formed by any of the methods shown above in connection with the application of the magnetic coating. The BC layer generally has a dry thickness of 0.1–3.0 μm, preferably not more than 1 μm, with a value of not more than 0.6 μm being particularly preferred. The loading of nonmagnetic particles in the BC layer generally ranges from 100–400 mg/m$^2$, preferably from 200–300 mg/m$^2$.

As in the case of the magnetic layer 2, the BC layer 3 may also contain as a binder the polycarbonate polyol polyurethane (as well as the optional resins described above) for the purpose of providing the BC layer with the inherent advantages of that polyurethane resin (e.g. reduced jitter). The results of incorporating the polycarbonate polyol polyurethane in the BC layer as the binder are similar to the data shown in FIGS. 1 to 5 except that the y-axis of the graphs of FIGS. 1 and 2 plots jitter (μm), and the y-axis in the graphs of FIGS. 3, 4 and 5 represents wear resistance (a better resistance is obtained as one moves further upward on the axis), tackiness (a lower tackiness is obtained as one moves further upward on the axis), and wear amount, respectively. The data of FIGS. 7 to 9 is equally applicable to the case where the polycarbonate polyol polyurethane is incorporated in the BC layer as the binder.

The BC layer 3 is necessary for high-quality tape, but may be omitted in other applications.

Figure 10:
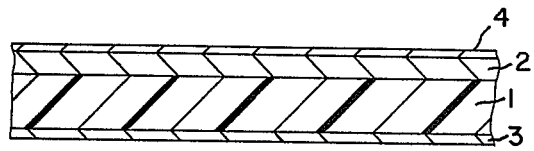

Another layer arrangement of the magnetic recording medium of the present invention is shown in FIG. 10, where in an overcoat (OC) 4 is formed on the magnetic layer 2 of the medium shown in FIG. 6. The function of the OC layer 4 is to protect: the magnetic layer 2 from external damage, and in order to fulfill this function, the overcoat must have sufficient lubricity. To this end, the OC layer 4 may be incorporated with the polycarbonate polyol polyurethane, preferably in combination with a cellulosic resin and vinyl chloride copolymer.

Figure 11:
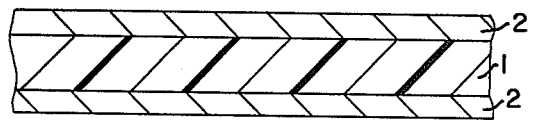

A magnetic recording medium especially designed for use as a magnetic disc is shown in FIG. 11, wherein the support 1 is sandwiched between magnetic layers 2 having the same composition as shown above. As in the case of the medium shown in FIG. 10, each magnetic layer 2 may be provided with an OC layer, which preferably contains a binder mainly composed of the polycarbonate polyol polyurethane.

Typical examples of the preparation of the binder according to the present invention, as well as illustrative working examples of the magnetic recording medium of the present invention, are shown below. It should be understood that various modifications can be made to the components, their proportions and the sequence of production steps without departing from the scope and spirit of the present invention. It should also be mentioned that all parts indicated hereinafter are by weight.

SYNTHESIS OF POLYCARBONATE POLYOL

Diethyl carbonate (590 parts) was reacted with 1,6-hexanediol (650 parts) for 15 hours at 120°–200° C. After cooling the reaction mixture to 150° C., the residual ethanol and unreacted diol were thoroughly distilled off at a reduced pressure of 20–50 mmHg so as to obtain a polycarbonate polyol (770 parts). This polyol had a hydroxyl value of ca. 66 (mol. wt.=ca. 1,700).

SYNTHESIS OF POLYCARBONATE POLYOL POLYURETHANE SYNTHESIS EXAMPLE 1

The polycarbonate polyol prepared as above (170 parts) and diphenylmethane diisocyanate (MDI, 25 parts) were dissolved in methyl ethyl ketone (580 parts). The solution was heated at 80° C. for 6 hours in the presence of dibutyltin dilaurate as a urethanating catalyst (0.03 part). As a result, a solution (770 parts) of polycarbonate polyol polyurethane in methyl ethyl ketone was obtained (solids content: 25.0%, $\overline{Mw}$ of polyurethane: $14 \times 10^4$).

SYNTHESIS EXAMPLE 2

The polycarbonate polyol (162 parts) which was the same as the polyol used in Synthesis Example 1, and MDI (125 parts) were dissolved in methyl ethyl ketone (560 parts). The solution was heated at 80° C. for 4 hours in the presence of dibutyltin dilaurate as a urethanating catalyst (0.03 part). Following addition of 1,3-butanediol (0.45 part), the mixture was further heated at 80° C. for 2 hours. As a result, a solution (740 parts) of polycarbonate polyol polyurethane in methyl ethyl ketone was obtained (solids content: 25.4%, $\overline{Mw}$ of polyurethane: $13 \times 10^4$).

SYNTHESIS EXAMPLE 3

The polycarbonate polyol (153 parts) which was the same as the polyol used in Synthesis Example 1, as well as MDI (125 parts) and neopentyl glycol (1.1 part), were dissolved in methyl ethyl ketone (540 parts). The solution was heated at 80° C. for 6 hours in the presence of dibutyltin dilaurate as a urethanating agent (0.03 part). As a result, a solution (715 parts) of polycarbonate polyol polyurethane in methyl ethyl ketone was obtained (solids content: 24.8%, $\overline{Mw}$ of polyurethane: $9.5 \times 10^4$).

SYNTHESIS EXAMPLE 4

The polycarbonate polyol (153 parts) which was the same as the polyol used in Synthesis Example 1, as well as MDI (125 parts) and trimethanolpropane (1.2 part), were dissolved in methyl ethyl ketone (540 parts). The solution was heated at 80° C. for 6 hours in the presence of dibutyltin dilaurate (0.03 part) as a urethanating agent. As a result, a solution (714 parts) of polycarbonate polyol polyurethane was obtained (solids content: 25.0%, $\overline{Mw}$ of polyurethane: $10 \times 10^4$).

EXAMPLE 1

Magnetic particles (γ-iron oxide) were coated with Co by a routine method and to the mother liquor was added an aqueous solution of a copolymer that was included within the scope of the present invention (i.e., a copolymer composed of unit A wherein the two carboxyl groups of an alkylene derived from maleic anhydride were converted to a quaternary ammonium salt, and unit B made of diisobutylene). The amount of the copolymer added was 21 parts for 79 parts of water.

The pH of the adosrption bath was adjusted to 7 by addition of dilute sulfuric acid. After agitation for 1 hour at room temperature, the treated magnetic particles were subjected to filtration and washed with water to remove the unadsorbed polymer. The amount of the polymer adsorbed was 0.8 g per 100 g of the magnetic particles. The particles were then dried and sieved.

Using the so treated magnetic particles, a magnetic paint having the composition shown below (with respect to 300 g of the solvent) was prepared. A video tape sample ½ inch wide was fabricated using this magnetic paint by a routine method.

| Components | Amounts (in parts) |
|---|---|
| Surface-treated Co-γ-iron oxide | 100 |
| Polyether polycarbonate polyurethane | 10 |
| Partially hydrolyzed vinyl chloridevinyl acetate copolymer | 10 |
| Myristic acid | 1 |
| Butyl palmitate | 1 |
| $Al_2O_3$ | |
| Valcan XC-72 (electroconductive carbon black) | 5 |
| Collonate (curing agent) | 5.4 |

EXAMPLE 2

A magnetic tape sample was prepared as in Example 1 except that the pH of the mother liquor used in the surface treatment of magnetic particles was adjusted to 6.

EXAMPLE 3

A magnetic tape sample was prepared as in Example 1 except that one part of lecithin powder was added to the magnetic paint for 100 parts of the magnetic powder.

EXAMPLE 4

A magnetic tape sample was prepared as in Example 1 except for the following points: the aqueous solution of copolymer was added to 100 g of a filtered and dried Co-modified γ—$Fe_2O_3$ powder; the pH of the mother liquor was adjusted to 6; the magnetic particles to which the copolymer was adsorbed were filtered, dried, ground and passed through a sieve; and the so treated magnetic particles were subsequently processed as in Example 1.

EXAMPLE 5

A magnetic tape sample was prepared as in Example 1 except that the pH of the mother liquor used in the surface treatment of magnetic particles was adjusted to 9.

COMPARATIVE EXAMPLE 1

A tape sample was prepared as in Example 1 except that the copolymer used had a free carboxyl group rather than its $NH_4$ salt and exhibited a water solubility of no higher than 10%.

COMPARATIVE EXAMPLE 2

A tape sample was prepared as in Example 4 except that a methanol solution of the copolymer disclosed in Unexamined Published Japanese Patent Application No. 23207/1975 (i.e., a half amide of maleic acid containing a carboxyl group and an acid amide; the copolymer used in Example 1 contained an ammonium salt of maleic acid).

Each of the seven samples of magnetic tape thus prepared was subjected to the measurements of coercive force (Hc), residual magnetic flux density (Br), skew (Sq), gloss and video characteristics. The results are shown in the following table.

Gloss: The gloss as determined by a gloss meter was evaluated as a percentage of the value for a standard plate measured at 60° as both angles of incident and emerging light.

Video S/N and color S/N: Signals obtained from a video deck operating by a conventional method were directly read on a meter. The S/N values are indicated in decibels, with the value for the sample of Comparative Example 1 being taken as 0 dB.

TABLE 1

| | PH of adsorption bath | He (Oe) | Br (Gauss) | Sq | Gloss (%) | Video S/N (dB) | Color S/N (dB) |
|---|---|---|---|---|---|---|---|
| Example 1 | 7 | 650 | 1310 | 0.79 | 135 | +6.0 | +4.0 |
| 2 | 6 | 665 | 1390 | 0.81 | 138 | +6.5 | +5.0 |
| 3 | 6 | 703 | 1402 | 0.82 | 141 | +7.0 | +4.0 |
| 4 | 6 | 643 | 1309 | 0.77 | 122 | +5.0 | +3.0 |
| 5 | 9 | 649 | 1360 | 0.75 | 112 | +4.0 | +2.5 |
| Comparative Example 1 | 6 | 630 | 1260 | 0.69 | 85 | 0 | 0 |
| Comparative Example 2 | — | 640 | 1300 | 0.75 | 102 | +1.5 | +2.0 |

The above data show that the magnetic particles the surfaces of which were treated by the copolymer within the scope of the present invention without drying after Co adsorption had good dispersibility and the magnetic layers using such particles exhibited good magnetic and electrical properties. The effect of this copolymer was dependent on the pH of the mother liquor used in the adsorption of the copolymer and best results were obtained when the pH was adjusted to 6 but not satisfactory adsorption was achieved by treatment at a pH of 9. The magnetic particles that were treated with the copolymer after filtering and drying Co-coated particles had a relatively poor dispersibility and the magnetic layer using such particles produced a slightly lower S/N ratio and this is probably because the polymer was adsorbed on agglomerating particles.

EXAMPLE 6

| | |
|---|---|
| Metallic magnetic powder (Surface-treated as in Example 1) | 100 (parts) |
| Polycarbonate based urethane | 8 |
| Phenoxy resin | 8 |
| Lecithin | 4 |
| Myristic acid | 4 |
| Isooctyl myristate | 4 |

-continued

| | |
|---|---|
| Chromium oxide | 4 |

A mixture having the composition shown above was dispersed in 300 g of a solvent, and a magnetic disk with a diameter of 2 inches was fabricated using the resulting magnetic paint.

COMPARATIVE EXAMPLE 3

A magnetic disk sample (2 in$\phi$) was fabricated as in Example 6 except that the polycarbonate based urethane was replaced by a conventional polyester urethane (e.g. Nippon N 2304 of Nippon Polyurethane Industry Co., Ltd.).

COMPARATIVE EXAMPLE 4

A magnetic disk sample (2 in$\phi$) was fabricated as in Example 6 except that no surface treatment of the magnetic particles was conducted.

EXAMPLE 7

A durability test was conducted with the magnetic disk samples prepared in Example 6 and Comparative Examples 3 and 4. The sample of Example 6 experienced no drop in output even when it was driven on a disk drive for 12 hours or longer, but the sample of Comparative Example 3 showed an output drop of 2 dB or more in only about 25 minutes. The sample of Comparative Example 4 could be driven for 2 hours without experiencing any significant drop in output, but after the lapse of 3 hours, a drop of 1.0 dB occurred.

TABLE 2

| Components in magnetic paint | Ex. 8 | Ex. 9 | Ex. 10 | Ex. 11 | Comp. Ex. 5 | Comp. Ex. 6 | Comp. Ex. 7 | Comp. Ex. 8 |
|---|---|---|---|---|---|---|---|---|
| Co-containing $\gamma$-$Fe_2O_3$ | 100 | 100 | | 100 | 100 | | 100 | 100 |
| Fe-based metallic magnetic powder | | | 100 | | | 100 | | |
| Polyurethane (of the invention) | Synthesis (1) 8 | Synthesis (2) 8 | Synthesis (4) 8 | Synthesis (1) 6 | | | | |
| Polyurethane (polyester type) | | | | | 8 | 8 | 8 | 8 |
| Vinyl chloride-vinyl acetate copolymer (VAGH) | 8 | | | 8 | 8 | | 8 | |
| Phenoxy resin (PKHH) | | 8 | 8 | | | 8 | | |
| Urethane resin having yield point | | | | 2 | | | | |
| Mixture of monoester and di ester of Compound ii* | 3 | 3 | 4 | 3 | | | | 3 |
| Comparative compound** | | | | | 3 | 4 | 3 | |
| Palmitic acid | 1 | 1 | 1 | 1 | 1 | 1 | 1 | 1 |
| Butyl stearate | 1 | 1 | 1 | 1 | 1 | 1 | 1 | 1 |
| Alumina | 4 | 4 | 4 | 4 | 4 | 4 | 4 | 4 |
| Carbon black | 3 | 1 | 1 | 3 | 3 | 1 | 3 | 3 |
| Cyclohexanone | 200 | 200 | 200 | 200 | 200 | 200 | 200 | 200 |
| Methyl ethyl ketone | 70 | 70 | 70 | 70 | 70 | 70 | 70 | 70 |
| Toluene | 30 | 30 | 30 | 30 | 30 | 30 | 30 | 30 |

*Mixture of 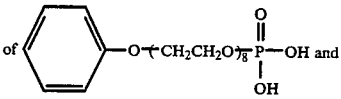 and

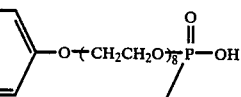

**Mixture of monoester and diester of

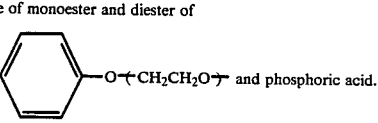 and phosphoric acid.

Each of the video tape samples was subjected to the measurement of the following factors.

Chroma S/N:
Measured with a color video noise meter, Shibasoku 925 D/1.

Luminance S/N:
Same as above.

RF output:
A hundred reproductions were made at 5 MHz on a VTR deck for RF output measurement and the decrease (in dB) from the initial output was determined.

Life of still image:
The time required for the output of a still image to decrease by 2 dB was measured and indicated in minutes. The longer this time period, the more durable and wear-resistant the sample is.

The results of these measurements are summarized in Table 3 to indicate the performance of the video tape samples.

TABLE 3

|  | Ex. 8 | Ex. 9 | Ex. 10 | Ex. 11 | Comp. Ex. 5 | Comp. Ex. 6 | Comp. Ex. 7 | Comp. Ex. 8 |
|---|---|---|---|---|---|---|---|---|
| Chroma S/N (dB) | +1.5 | +1.5 | +1 | +1.5 | 0 | 0 | −2.0 | +0.5 |
| Luminance S/N (dB) | +2 | +2.5 | +1.5 | +2.5 | 0 | 0 | −2.5 | +1.5 |
| RF output (dB) | +2.5 | +2.5 | +2.5 | +2.0 | 0 | 0 | −2.5 | +1.5 |
| Life of still image (min) | 120 | 120 | 120 | 120 | 45 | 40 | 10 | 120 |
| RF output after standing at 60° C. for 72 hrs. | +1.5 | +3.0 | +2.0 | +2.0 | 0 | 0 | −1.5 | +0.5 |

The values of chroma S/N, luminance S/N and RF output for the samples of Examples 8 and 9 were determined against those for the sample of Comparative Example 5 which were assumed to be 0 dB. The corresponding values for the sample of Example 10 were determined against those for the sample of Comparative Example 6.

The data in Table 3 show that magnetic tape having significantly improved performance can be produced by incorporating the compound of formula (I) and the polycarbonate based polyurethane in a magnetic layer in accordance with the present invention.

What we claim is:

1. A magnetic recording medium comprising a support and a magnetic recording layer provided on said support, said magnetic recording layer containing
   (i) magnetic particles;
   (ii) a polycarbonate polyurethane resin having no ester bond and obtained by the reaction of a polycarbonatepolyol of the formula

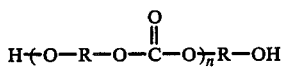

wherein R is selected from the group consisting of aliphatic hydrocarbons having 4 to 12 carbon atoms and aromatic hydrocarbons having 6 to 12 carbon atoms, and n is an integer of not greater than 50 with a polyisocyanate containing a plurality of isocyanate groups and, if necessary, a polyol; and
   (iii) a dispersant represented by the formula:

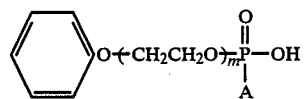

wherein A is hydroxyl, —OM, or

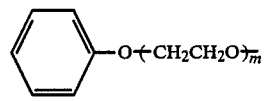

wherein m is an integer from 1 to 30, and M is an alkali metal, or a salt of a copolymer containing a monomer unit having at least one anionic organic group, said salt of the copolymer being used for pretreatment of said magnetic particles, and wherein said resin is present in an amount of 5 to 400 parts by weight per 100 parts by weight of said magnetic particles and said dispersant is present in an amount of 1 to 10 parts by weight per 100 parts by weight of said magnetic particles.

2. The medium of claim 1 wherein said amount is 2 to 7 parts by weight per 100 parts by weight of said particles.

3. The medium of claim 1 wherein the molecular weight of said polycarbonatepolyol is about 500–3,500.

4. A magnetic recording medium according to claim 1, wherein said polyisocyanate is an aromatic polyisocyanate.

5. A magnetic recording medium according to claim 4, wherein the molecular weight of said polyisocyanate is 100 to 3,000.

6. A magnetic recording medium according to claim 5, wherein said polyisocyanate is selected from the group consisting of tolylene diisocyanate and 4,4-diphenylmethane diisocyanate.

7. A magnetic recording medium according to claim 1, wherein said polyisocyanate is an aliphatic polyisocyanate.

8. A magnetic recording medium according to claim 7, wherein the molecular weight of said polyisocyanate is 100 to 3,000.

9. A magnetic recording according to claim 8, wherein said polyisocyanate is selected from the group consisting of hexamethylene diisocyanate and isophorone diisocyanate.

10. A magnetic recording medium according to claim 1, wherein said polyol is a diol having 1 to 10 carbon atoms.

11. A magnetic recording medium according to claim 10, wherein said diol is selected from the group consisting of 1,3-butanediol, 1,4-butanediol, neopentyl glycol and 1,6-hexanediol.

12. The medium of claim 1 wherein said dispersant is taken from
the class consisting of
Compound (i):

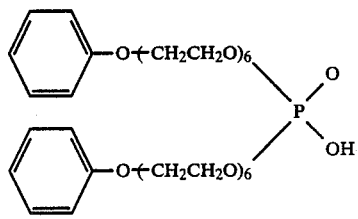

and/or a monophosphate ester thereof;
Compound (ii):

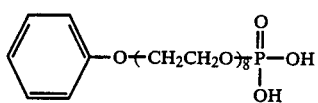

and/or a diphosphate ester thereof;

Compound (iii):

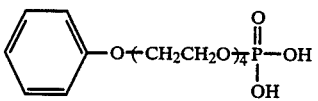

and/or a diphosphate ester thereof;

Compound (iv):

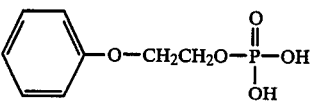

and/or a diphosphate ester thereof;

Compound (v):

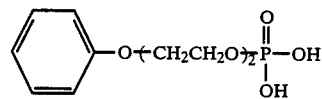

and/or a diphosphate ester thereof;

Compound (vi):

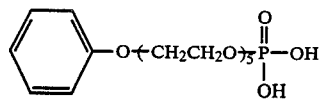

and/or a diphosphate ester thereof;

Compound (vii):

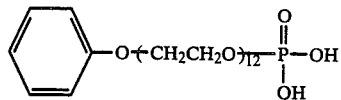

and/or a diphosphate ester thereof; and

Compound (viii):

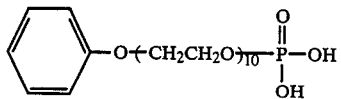

and/or a diphosphate ester thereof.

13. The medium of claim 1 wherein said dispersant has an hydrophilic-lipophilic balance value of 8-14.

* * * * *